(12) United States Patent
Brunet

(10) Patent No.: US 12,497,531 B2
(45) Date of Patent: Dec. 16, 2025

(54) THERMOPLASTIC AND THERMOSETTING RESIN-CONTAINING INK COMPOSITIONS AND METHODS FOR THEIR APPLICATION

(71) Applicant: YETI Coolers, LLC, Austin, TX (US)

(72) Inventor: Colby Brunet, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 183 days.

(21) Appl. No.: 18/220,456

(22) Filed: Jul. 11, 2023

(65) Prior Publication Data
US 2024/0026179 A1 Jan. 25, 2024

Related U.S. Application Data

(60) Provisional application No. 63/389,457, filed on Jul. 15, 2022.

(51) Int. Cl.
| | |
|---|---|
| *C09D 11/38* | (2014.01) |
| *B41M 5/00* | (2006.01) |
| *B41M 5/52* | (2006.01) |
| *C09D 11/03* | (2014.01) |
| *C09D 11/10* | (2014.01) |
| *C09D 11/30* | (2014.01) |
| *C09D 11/32* | (2014.01) |

(52) U.S. Cl.
CPC .......... *C09D 11/38* (2013.01); *B41M 5/0047* (2013.01); *B41M 5/0064* (2013.01); *B41M 5/5209* (2013.01); *C09D 11/03* (2013.01); *C09D 11/10* (2013.01); *C09D 11/30* (2013.01); *C09D 11/32* (2013.01)

(58) Field of Classification Search
CPC ......... C09D 11/38; C09D 11/03; C09D 11/10; C09D 11/30; C09D 11/32; B41M 5/0047; B41M 5/0064; B41M 5/5209
See application file for complete search history.

(56) References Cited

U.S. PATENT DOCUMENTS

| | | | |
|---|---|---|---|
| 4,978,969 A | 12/1990 | Chieng | |
| 7,141,104 B2 | 11/2006 | De Voeght et al. | |
| 2001/0048968 A1 | 12/2001 | Cox et al. | |
| 2004/0091642 A1 | 5/2004 | Murakami et al. | |
| 2006/0138243 A1 | 6/2006 | Bi et al. | |
| 2006/0251902 A1 | 11/2006 | Botrie et al. | |
| 2006/0269756 A1 | 11/2006 | Botrie et al. | |
| 2011/0069109 A1* | 3/2011 | Tojo | B41M 5/0023 347/21 |
| 2017/0183514 A1* | 6/2017 | Benac | C08K 3/013 |
| 2019/0240898 A1* | 8/2019 | Chaffins | B29C 64/255 |

FOREIGN PATENT DOCUMENTS

| | | | |
|---|---|---|---|
| CN | 113801415 A | 12/2021 | |
| JP | 2010010461 A | 1/2010 | |
| JP | 2017159912 A | * 9/2017 | ............. B65D 81/34 |

OTHER PUBLICATIONS

Jan. 8, 2024—(WO) International Search Report & Written Opinion—PCT/US23/069957.

* cited by examiner

*Primary Examiner* — Yaovi M Ameh

(74) *Attorney, Agent, or Firm* — Banner & Witcoff, Ltd.

(57) ABSTRACT

Ink compositions are disclosed that can be applied to, and resin components thereof adhered onto, a variety of substrates. Particular compositions utilize electromagnetic susceptor particles that, upon being subjected to electromagnetic energy of the appropriate wavelength (e.g., radiofrequency (RF) energy or microwave energy), heat thermoplastic resin particles of the composition cause localized heating. This can, in turn, result in melting and consolidation of thermoplastic resin particles onto a substrate. Direct heating may also be used to cause consolidation. Other compositions, comprising thermosetting resin particles, can be cured onto a substrate by exposure to actinic radiation, heat, moisture, or a combination of these. The ink compositions can be applied according to a variety of possible methods, including inkjet printing, intaglio printing, silk screen printing, stencil printing, painting, etc. Further flexibility resides in the possible use of a transfer medium (e.g., transfer film) onto which the ink composition is printed, for indirect application to the substrate.

19 Claims, No Drawings

THERMOPLASTIC AND THERMOSETTING RESIN-CONTAINING INK COMPOSITIONS AND METHODS FOR THEIR APPLICATION

CROSS-REFERENCE TO RELATED APPLICATIONS

This application claims priority to U.S. provisional application No. 63/389,457, filed Jul. 15, 2022, which is incorporated by reference in its entirety.

FIELD OF THE INVENTION

The present invention relates to ink compositions comprising thermoplastic or thermosetting resin particles, which can be printed directly on a wide variety of substrates, including plastic or metallic containers, or optionally on a transfer medium for indirect application to such substrates. The resin particles may be fused to the substrate by melting or curing.

DESCRIPTION OF RELATED ART

The use of resins for printing on or coating various substrates (e.g., in providing labels and decals) is known, and these are often employed in high gloss, thermoplastic or thermosetting compositions that can provide aesthetic enhancement and/or environmental protection to the substrate. For example, in the case of thermosetting compositions, these may be cured on a substrate by the application of heat (e.g., in the case of thermosetting resins), radiation (e.g., in the UV portion of the electromagnetic spectrum), electron beam, moisture, or a combination of methods. Examples of resin compositions that can be used to form print and coatings of varying thicknesses, in some cases through the use of inkjet printing, are described, for example, in US 2006/0251902; US 2006/0269756; US 2006/0138243; U.S. Pat. Nos. 7,141,104; 4,978,969; US 2004/0091642; US 2001/0048968; and other documents.

A number of characteristics of resin-containing ink compositions are important for achieving a desired appearance of the final article having the resin adhered thereon by melting or curing. For example, these compositions should flow sufficiently to cover a desired portion of the substrate surface, namely the portion to be printed, but not adjacent surfaces. Such compositions should also provide print dimensions to achieve an intended aesthetic effect, for example in the case of lettering that is typically on the order of 0.5-1 mm thick, such that an appealing, three-dimensional effect is achieved. To the extent possible, the hardening of the resin, which results in its adherence to the substrate, should not cause shrinkage, wrinkles, surface imperfections, curling, or other defects. The adhered print that remains from a given ink composition, such as following evaporation of solvent and optionally other volatile materials, should maintain its hardness and flexibility, even after heat and environmental aging.

For a given ink composition, the combination of flow properties (e.g., dependent on viscosity and the viscosity/temperature profile), adherence, droplet formation (e.g., dependent on surface tension), and other characteristics should be suitable for the substrate and printing method used. Moreover, the printing method itself should, in the ideal situation, not subject the substrate to excessively harsh conditions. For example, known screen printing techniques using resin can require oven temperatures of up to 260° C. or more and/or open flame, in order to evaporate solvent from the ink composition and/or sufficiently melt the polymer. Similar processing conditions are encountered with low viscosity, organic solvent-based inks or water-based inks that are conventionally used in intaglio printing, such as gravure printing. The drying of these inks normally requires that the substrate to which they are applied be passed through gas or electric fired dryers that can evaporate the solvent. Furthermore, these dryers must generally be equipped with pollution control devices to prevent the detrimental solvent constituents from being released into the environment.

There remains a need for resin-containing ink compositions that are compatible with, or can be tailored to, a given substrate. The avoidance of a severe operating environment, to which the substrate must be exposed, would likewise benefit the state of the art.

SUMMARY OF THE INVENTION

Aspects of the invention relate to the discovery of ink compositions that can be applied to, and adhered onto, a variety of substrates without the need for their exposure to a high-temperature oven environment or flame. Particular compositions utilize electromagnetic susceptor particles that, upon being subjected to electromagnetic energy of the appropriate wavelength (e.g., radiofrequency (RF) energy or microwave energy), heat these particles to cause localized heating within the composition. This can, in turn, result in melting and consolidation of resin particles of the composition, optionally in conjunction with solvent volatilization, to provide a resin-printed substrate such as a container (e.g., plastic cooler), having the consolidated resin, for example in the form of lettering or a decoration, affixed with a high degree of structural integrity.

Other aspects relate to ink compositions comprising thermoplastic or thermosetting resin particles, which compositions in general can be applied according to a variety of possible methods, including inkjet printing, intaglio printing, silk screen printing, stencil printing, painting, etc. Further flexibility resides in the possible use of a transfer medium (e.g., transfer film) onto which the ink composition is printed, for indirect application to the substrate. In the case of ink compositions comprising thermoplastic resin particles, these may be heated and consolidated as described above. Preferred types of thermoplastic resins have a relatively low melting temperature (e.g., less than about 200° C., and more preferably less than about 175° C.) and/or a low melt index (e.g., from about 0.1 to about 100 grams/10 minutes, and more preferably from about 0.1 to about 10 grams/10 minutes, according to ASTM-1238).

In the case of ink compositions comprising thermosetting resin particles (e.g., thermosetting polyurethane particles or thermosetting polyester particles that are used in a powder coating composition), these may be cured by subjecting the composition (or areas of the substrate where the composition has been applied) to heat and/or actinic radiation that initiates a cross-linking reaction. Such thermosetting resin-containing ink compositions may preferably exclude electromagnetic susceptor particles, and may consequently, relative to certain thermoplastic resin-containing ink compositions described herein, be more suitable for application to metallic substrates (e.g., substrates comprising stainless steel, including stainless steel drinkware items) that might otherwise themselves be susceptible to heating with electromagnetic energy. In an embodiment, thermal curing may be performed with the added effect of removing excess moisture and/or volatile components of the ink composition.

This may be achieved according to a step involving a "thermal bake" that provides a final cure and substrate that is printed in a durable manner. In the case of curing via actinic radiation (e.g., UV radiation), the ink compositions may comprise a suitable photoinitiator, for example as a component of the thermosetting resin particles or alternatively as a separate component of the ink composition.

Yet other aspects relate to ink compositions that can be readily tailored to a given substrate and/or printing application, such as by their formation upon application (e.g., by applying separate vehicles comprising components of the ink compositions, simultaneously or sequentially) to the substrate. Respective, tailored ink compositions may differ, for example, in terms of the types and/or amounts of thermoplastic and/or thermosetting resin particles present, as well as types and/or amounts of colorants, whether these are incorporated into the resin particles or present as a separate component. Improvements in compatibility, associated with these compositions, can result from maintaining separate fractions, or vehicles, of the compositions, which may be combined shortly before, or otherwise upon, application to the substrate.

More particularly, the compositions may comprise, or consist of, both a base ink vehicle and a customizable ink vehicle, with the former being used in multiple compositions applied to different substrates and the latter being "tailored" to a specific application. In the case of ink compositions comprising thermoplastic or thermosetting resin particles, for example, these may be contained in a customizable ink vehicle, optionally together with a colorant that is incorporated into the resin particles or present as a separate component. A base ink vehicle of an ink composition comprising thermoplastic resin particles may comprise a solvent and electromagnetic susceptor particles, whereas a base ink vehicle of an ink composition comprising thermosetting resin particles may comprise a solvent and optionally a photoinitiator. In this manner, a single base ink vehicle may be utilized to form different ink compositions, with the differences being imparted by different customizable ink vehicles that are tailored to a specific substrate. For example, thermoplastic resin particles or thermosetting resin particles of the customizable ink vehicle may be matched to, such as in the case of being particles comprising polymer of the same type as, the material of the substrate. In the same manner, the optional colorant of the customizable ink vehicle may be matched to the color of the substrate, such as in the case of being the same color as that of the substrate or being a color having a desired aesthetic effect when combined with that of the substrate (e.g., a desired combination of colors of printed lettering, or a printed decoration, on a background corresponding to the color of the substrate).

Possibilities for tailoring ink compositions, including those comprising a "constant" base ink vehicle and a "variable" customizable ink vehicle as described herein, arise from the use of different vehicles to form the ink compositions upon their separate or simultaneous application to the substrate. Particular methods described herein for performing this application, such as inkjet printing, are especially compatible with the use of base and customizable ink vehicles that may be combined to form desired compositions in a flexible manner (e.g., "on demand") that are adapted to a given substrate.

Particular embodiments of the invention are directed to ink compositions comprising a solvent, electromagnetic susceptor particles, thermoplastic resin particles, and optionally a colorant (e.g., as a component of, or being incorporated in, the resin particles or otherwise as a separate component of the ink composition). Further embodiments are directed to methods of using these compositions for printing on, or decorating, a substrate. Upon subjecting the composition to electromagnetic energy (e.g., radiofrequency energy or microwave energy), the resin particles may become consolidated on, and adhered to, the substrate by one or both of melting and solvent evaporation, as a result of localized heating from the electromagnetic susceptor particles. Other embodiments are directed to ink compositions comprising a solvent, thermosetting resin particles, optionally a colorant, and optionally a photoinitiator (e.g., with one or both optional components being components of, or being incorporated in, the resin particles or otherwise being separate components of the ink composition). Further embodiments are directed to methods of using these compositions for printing on, or decorating, a substrate. Upon subjecting the composition to heat or actinic radiation (e.g., UV radiation), the resin particles may become consolidated on, and adhered to, the substrate by one or both of chemical cross-linking and solvent evaporation. With respect to any of the ink compositions described herein, prior to subjecting these compositions to electromagnetic energy, heat, or actinic radiation, they may be applied to the substrate according to a number of printing methods, including inkjet printing, intaglio printing, screen printing, stencil printing, painting, etc.

These and other aspects and embodiments of the invention, as well as their associated advantages, are apparent from the following Detailed Description.

DETAILED DESCRIPTION

Representative ink compositions described herein for application to a substrate (e.g., a container such as a cooler or drinkware item) are, more particularly, thermoplastic resin-containing ink compositions. Such compositions comprise a solvent, electromagnetic susceptor particles, and thermoplastic resin particles. The electromagnetic susceptor particles become heated when the thermoplastic resin-containing ink composition is subjected to electromagnetic energy of the appropriate frequency, typically radiofrequency energy or microwave energy. This causes localized heating and melting of at least a portion of the thermoplastic resin particles (e.g., those in the vicinity of electromagnetic susceptor particles having been subjected to the electromagnetic energy), such that the resin becomes consolidated on, and adhered to, the substrate. This consolidation/adherence may be in the form of lettering or a decoration, according to which the ink composition was initially applied to the substrate (e.g., by inkjet printing or other printing method). Other representative ink compositions for such application to a substrate are, more particularly, thermosetting resin-containing ink compositions. Such compositions comprise a solvent, thermosetting resin particles, and optionally a photoinitiator. The thermosetting resin particles, or thermosetting polymer contained in these particles, become cured (by chemical cross-linking) when subjected to heat or actinic radiation. This curing, optionally in combination with solvent evaporation, results in the resin becoming consolidated on, and adhered to, the substrate. In some cases, consolidation may be effected by solvent evaporation alone. In any event, this consolidation/adherence may be in the form of lettering or a decoration, according to which the ink composition was initially applied to the substrate (e.g., by inkjet printing or other printing method).

Whereas the consolidation steps for thermoplastic resin-containing ink compositions and thermosetting resin-containing ink compositions may differ, both types of compositions may be used to effectively print substrates with lettering (e.g., text) and/or decorations (e.g., pictures, patterns, or designs).

Ink Compositions Comprising Thermoplastic or Thermosetting Resin Particles

Thermoplastic or thermosetting resin particles may be present in representative ink compositions as a discontinuous solid phase, for example when in the presence of the solvent and/or other components that provide a continuous liquid phase. These particles may, in some embodiments, be in the form of a finely divided powder, such as in the case of those used as powder coating materials. Representative average particle sizes of resin particles, whether comprising a thermoplastic polymer or thermosetting polymer, may be generally from about 1 nanometer to about 1 millimeter, typically from about 1 nanometer to about 500 microns, and often from about 50 nanometers to about 1 micron.

Particular thermoplastic resin particles comprise one or more thermoplastic polymers selected from a thermoplastic polylolefin, a thermoplastic polyurethane, a thermoplastic polyether, a thermoplastic polyester, a thermoplastic polyacrylate, a thermoplastic polystyrene, a thermoplastic polyamide, a thermoplastic polyvinylchloride, a thermoplastic polycarbonate, a thermoplastic cellulosic polymer, and a thermoplastic acrylonitrile-butadiene-styrene (ABS) polymer. Exemplary thermoplastic polyolefins include polyethylene and polypropylene, with varying molecular weights, such as in the case of polyethylene blends of high and ultra high molecular weight polyethylene, optionally further in combination with polyethylene having a relatively lower density. Polyolefins further include copolymers of polyethylene, such as ethylene vinyl acetate copolymer, ethylene methylacrylate copolymer, ethylene ethylacrylate copolymer, ethylene propylacrylate copolymer, ethylene butylacrylate copolymer, etc., which may be used in combination with polyethylene and/or polypropylene. Other specific thermoplastic polyolefins extend to known "TPO (thermoplastic polyolefin) compounds" that are namely blends of polypropylene, un-crosslinked EPDM rubber, and polyethylene. Exemplary thermoplastic polyesters include polyethylene terephthalate (PET) and polybutylene terephthalate (PBT).

Particular thermosetting resin particles comprise one or more thermosetting polymers selected from a thermosetting polyepoxide (e.g., in the case of an epoxy resin), a thermosetting polyacrylate (e.g., in the case of an acrylic resin), a thermosetting polyurethane, a thermosetting polysiloxane (e.g., in the case of a silicone resin), a thermosetting polyester, a thermosetting phenolic polymer (e.g., in the case of a phenol-formaldehyde resin), and a thermosetting amine-functional polymer (e.g., in the case of a melamine-formaldehyde resin or urea-formaldehyde resin). Exemplary epoxy resins include bisphenol A diglycidyl ether (DGEBA) and epoxy phenol novolac (EPN). Epoxy resins also extend to epoxy vinyl ester resins (VER), commonly referred to as a vinyl ester resins.

As described above, upon being subjected to heat or actinic radiation, the thermosetting polymers may become cured by chemical cross-linking. In some cases, however, curing may be effected by exposure to moisture. In the case of thermosetting resin-containing ink compositions, solid particles of thermosetting resin particles may be sufficiently consolidated by heating alone (e.g., according to step (b) in representative methods described herein), causing evaporation of solvent and/or volatile components of the ink composition and leaving the solid resin adhered to the substrate. For example, the thermosetting resin particles may be in the form of a heat curable powder coating material such that, following application of the thermosetting resin-containing ink composition to the substrate, a subsequent "baking" step at elevated temperature can result in the substrate being printed with lettering and/or a decoration having high durability. Thermosetting resin-containing ink compositions may include suitable cross-linking agents, and these may be incorporated, more particularly, into the thermosetting resin particles, such as thermosetting polyurethane particles or thermosetting polyester particles that are used in powder coating compositions. Representative cross-linking agents include triglycidyl isocyanurate (TGIC) and β-hydroxylalkyl amide (HAA).

According to alternative embodiments, representative thermosetting resin-containing ink compositions may, instead of solid particles, contain the precursors (e.g., in liquid form) that are known to react to form these solid thermosetting polymers (resins), upon curing that may be initiated by being subjected to heat, actinic radiation, or moisture (e.g., according to step (b) in representative methods described herein). Such precursors, for example, include monofunctional or polyfunctional epoxides (oxiranes), amines, acids (such as acid anhydrides), phenols, alcohols (e.g., polyols), isocyanates, thiols, etc., as well as prepolymers capable of further polymerization to form the above-described thermosetting polymers (resins). Such precursors will be apparent to those skilled in the art, having knowledge of the present specification.

Representative thermosetting resin-containing ink compositions may therefore be, more particularly, actinic radiation- (e.g., UV radiation-) curable compositions, specific examples of which are those comprising an acrylate polymer (e.g., a urethane acrylate polymer), optionally in addition to one or more monofunctional, bifunctional, or higher functional acrylate monomers (e.g., a hydroxyalkyl acrylate such as 4-hydroxybutyl acrylate) that may be used to adjust viscosity for a particular application such as inkjet printing. Photoinitiators, such as free radical polymerization photoinitiators, may be used in these compositions. Other particular actinic radiation-curable compositions may comprise cycloaliphatic epoxides, caprolactone polyols, unsaturated alcohols, glycidyl ether of bisphenol A, monoepoxides, or vinyl ethers, and these may benefit from the addition of one or more reactive monomers, such as thiol compounds or vinyl ethers, for viscosity reduction. Such compositions may include a UV cationic curing promoter as a photoinitiator, such as a triarylsulfonium hexafluoroantimonate salt. Other photoinitiators include those known as "alpha cleavage type" compounds and "hydrogen abstracting" compounds, and any of the above photoinitiators may be used in conjunction with coinitiators, as will be apparent to those skilled in the art, having knowledge of the present specification. If used, a photoinitiator, combination of photoinitiators, or combination of at least one photoinitiator and at least one coinitiator, in a thermosetting resin-containing ink compositions, will be present typically in an amount, or combined amount, from about 0.01 wt-% to about 10 wt-%, and often from about 0.01 wt-% to about 5 wt-%.

With respect to any thermosetting resin-containing ink compositions described herein (whether or not they contain solid resin particles), in the case of curing by actinic radiation, this refers to the appropriate electromagnetic energy for initiating cross-linking (e.g., according to a photochemical reaction). Often, resin curing may advantageously proceed quickly at room temperature, therefore allowing high productivity without exposure of the substrate to high temperatures. Actinic radiation may be in the near infrared, visible, UV, X-ray, or other portions of the electromagnetic spectrum. Also, corpuscular radiation such as an electron beam may be a source of actinic radiation. UV radiation represents a particular type of energy, in the general wavelength range of 4 to 400 nanometers (nm), which can be used to cure representative thermosetting resin-containing ink compositions. Any conventional apparatus for generating actinic radiation of the proper wavelength (e.g., in the range of about 250-400 nm, or 300-350 nm) and intensity may be used, such as a mercury vapor discharge lamp.

Electromagnetic Susceptor Particles in Thermoplastic Resin-Containing Ink Compositions With respect to thermoplastic resin-containing ink compositions described herein, following application to the substrate, they may be subjected to electromagnetic energy sufficient for heating electromagnetic susceptor particles contained in these compositions. Such particles comprise, or may consist of, materials that absorb electromagnetic energy of a specific frequency, such as radiofrequency energy or microwave energy. The energy absorbed may have a defined frequency or wavelength, or be within a given frequency or wavelength range, for example (i) in the case of radiofrequency energy, a frequency from about 300 kHz to about 300 MHz, corresponding to a wavelength from about 1 m to about 1 km, such as a frequency from about 3 MHz to about 300 MHz, corresponding to a wavelength from about 1 m to about 100 m, or (ii) in the case of microwave energy, a frequency from about 300 MHz to about 300 GHz, corresponding to a wavelength from about 1 mm to about 1 m, such as a frequency from about 600 MHz to about 6 GHz, corresponding to a wavelength from about 5 cm to about 50 cm. This heating of the electromagnetic susceptor particles, following absorption of electromagnetic energy to which they are subjected (e.g., according to step (b) in representative methods described herein) can advantageously heat and melt thermoplastic resin particles in their immediate vicinity, leaving the solid resin adhered to the substrate. In some cases, softening and/or melting of the substrate itself, in the immediate region of the heated electromagnetic susceptor particles, can enhance the degree to which the resin becomes integrated with (e.g., bonded with or fused into) the substrate. In the case of either thermoplastic resin-containing ink compositions or thermosetting resin-containing ink compositions, consolidation of the resin and its adherence to the substrate is generally accompanied by evaporation of solvent and/or volatile components of the ink composition.

The use of electromagnetic susceptor particles allows for heating in precisely-defined locations, namely corresponding to only those where the thermoplastic resin-containing ink composition has been applied. This susceptor-mediated heating can thereby overcome the requirement for more generalized heating of the entire substrate, and can in fact promote resin consolidation without the need for any direct heat input. In addition to providing controlled and targeted heating effects, the electromagnetic susceptor particles can also fulfill other desirable functions, including structural enhancement and/or increased print thickness.

Suitable electromagnetic susceptor particles may comprise, consist essentially of, or consist of, a metal, such as an alkali metal, an alkaline earth metal, a transition metal, or a metalloid, or possibly a metal compound or metal alloy. Particular examples of these metals and metalloids are aluminum, tin, zinc, barium, iron, nickel, manganese, and silicon. Good conductors such as aluminum and tin, transition metals (e.g., copper, gold, zinc), and various alloys are especially suitable, including steel and stainless steel in particular. Particular examples of metal compounds are oxide, nitride, carbide, or titanate compounds of these and other metals and metalloids (e.g., silicon carbide and barium titanate). Exemplary metal oxides are various oxides of barium, iron, nickel, manganese, and zinc, as well as their mixed metal oxides. Metal compounds also extend to naturally-occurring or industrially-made minerals. For example, according to specific embodiments, mica, which encompasses about 30 aluminum-containing silicates, may be used to provide electromagnetic susceptor particles. Other electromagnetic susceptor particles may comprise, consist essentially of, or consist of, a form of carbon, such as graphite or charcoal. Combinations of any of the types of electromagnetic susceptor particles described herein may be used (e.g., a combination of one or more metals and one or more metal oxides, such as a combination of aluminum and mica).

Various forms of electromagnetic susceptor particles may be used, including flake, granular, powder, filing, etc. Aluminum flake can provide desirable properties as an electromagnetic susceptor, in terms of good dispersion of the aluminum particles within the ink composition that provides uniform heating in the manner described herein. Representative thermoplastic resin-containing ink compositions comprise from about 0.1 wt-% to about 20 wt-%, such as from about 1 wt-% to about 10 wt-%, of the electromagnetic susceptor particles, whether of a single type or combination of two or more types. Optionally in combination with these amounts being present in ink compositions, electromagnetic susceptor particles may have an average particle size from about 30 nanometers to about 100 microns, such as from about 40 nanometers to about 1 micron.

Colorants in Ink Compositions

Any of the thermoplastic resin-containing or thermosetting resin-containing ink compositions described herein may optionally comprise a colorant, such as a dye or pigment. The colorant may be integrated with the thermoplastic resin particles or the thermosetting resin particles, such that these particles themselves have a particular color. That is, the colorant may be a component of, or may be incorporated in, solid resin particles. Alternatively, the colorant may be a separate component of the ink composition, for example a component of the solvent-containing continuous liquid phase.

Suitable colorants include inorganic dyes and pigments, and such colorants may comprise, for example, titanium dioxide (rutile analase); iron oxides in hues such as yellow, buff, tan, brown, salmon, and black; lead oxide; calcium carbonate; cobalt alumina hydrate; barium sulfate; zinc oxide; metals such as strontium, chrome, copper, cobalt, aluminum, zinc, or other metals, which metals may be solid particles, such as in the form of flakes or spheres; iron chromates and molybdates having colors from light yellow to red orange; lead chromates; lead sulfate; lead molybdate; chrome yellows and oranges; cadmium pigments in a variety of yellows, oranges, reds, and maroons; nickel and titanium dioxide mixtures; sodium, potassium, or ammonium coordination compounds of ferric ferrocyanide; ultramarine blues (a calcined mixture of china clay, sodium carbonate, silica, sulfur, and reducing agents); cobalt aluminate (cobalt blues); chromium oxide; borate powders of aluminum, zinc, or copper; metallic silver pigments; pearlescent and iridescent flakes of basic lead carbonates, bismuth oxychlorides, or titanium coated mica. Suitable colorants also include organic dyes and pigments, and such colorants may comprise, for example, phthalocyanines (e.g., copper phthalocyanine); azos (e.g., benzimidazolone pigments or pyrazolorie pigments); perylenes; quinacridones; anthraquinones; indanthrones; pyrroles; condensation pigments; tetrachloroisoindolinones; carbon blacks; iridescent pigments; daylight fluorescent pigments (fluorescent dyes dissolved in a plastic matrix); and fluorescent ink bases. Other dyes and pigments that may be used as colorants are described in U.S. Pat. No. 7,141,104, and these dyes and pigments are incorporated herein by reference.

The amount of colorant in a thermoplastic resin-containing or thermosetting resin-containing ink composition can vary substantially, depending on the particular colorant used and shade/intensity of the particular color desired. Generally, the colorant may be present in an amount from about 1 wt-% to about 25 wt-%, and typically from about 3 wt-% to about 20 wt-%.

Solvents and Other Optional Components of Ink Compositions

Ink compositions described herein, to the extent that they may contain solid particles (e.g., solid resin particles, solid electromagnetic susceptor particles, solid particles of colorant, and/or other solid particles), may further comprise a solvent as a component of the ink composition and more particularly as component of, or substantially the entirety of, a suspension medium for the solid particles. The solvent normally provides a continuous liquid phase of the ink composition. Representative solvents include aqueous (water-based) solvents and organic solvents, with these latter types including hydrocarbons, alcohols, polyols, ethers, esters, carboxylic acids, etc. Preferred characteristics of some solvents, in addition to miscibility/compatibility with other components of the ink compositions, include relative non-volatility at temperatures at which they are applied to the substrate (e.g., according to step (a) in representative methods described herein), coupled with high volatility at temperatures to which they may be subjected (e.g., according to step (b) in representative methods described herein), for example either indirectly through heating via electromagnetic susceptor particles or directly through baking, for consolidation of thermoplastic or thermosetting resin and adherence to the substrate. This high volatility thereby facilitates removal of the solvent at the appropriate time. Certain aliphatic or aromatic hydrocarbon solvents, for example, have such characteristics in terms of their volatility-temperature profile. Those skilled in the art, having knowledge of the present specification, will be able to match a given printing application, including its characteristic temperatures at different steps, with a suitable solvent system. Hydrocarbon solvents and other solvents that may be used to form stable suspension of solid particles, including solid resin particles, are present in the ink composition in an amount generally from about 10 wt-% to about 65 wt-%, and typically from about 25 wt-% to about 45 wt-%.

A dispersant may be included as a component of an ink composition, to promote formation and stabilization of a dispersion of thermoplastic or thermosetting resin particles (e.g., in the form of powders), optionally in combination with colorants (e.g., dyes and/or pigments) and possibly other additives. Stabilization of a dispersion generally refers to the prevention of flocculation or agglomeration of the solid particles in the liquid suspension. Suitable dispersants for these purposes include rosin derivatives, fluorinated polyesters, acrylic resins, phosphated polyesters, ethyleneamines (e.g., diethylenetriamine, ethylenediamine, triethylenetetramine, tetraethylenepentamine), manganese soaps of distilled tall oil fatty acids, and succinimide-based dispersants. Any of these dispersants may be present in ink compositions described herein, and can achieve their intended effects when present in the ink composition in an amount generally from about 0.01 wt-% to about 10 wt-%, and typically from about 0.05 wt-% to about 5 wt-%.

Other additives include binders, to provide initial adhesion of resin particles to each other and the substrate after application thereon; surfactants, to achieve desired flow and leveling characteristics of the ink compositions; humectants, to prevent premature drying; and viscosity and rheology modifiers, to achieve target viscosity and rheological behavior, particularly thixotropy. Yet other additives of ink compositions described herein include flow agents, foam control agents, plasticizing agents (plasticizers), moisture scavengers, temperature stabilizers, ultraviolet radiation stabilizers, thickeners, antioxidants, biocides, buffering agents, antimold agents, pH adjustment or control agents, electric conductivity adjustment agents, chelating agents, anti-rusting agents, light stabilizers, and conducting or semiconducting polymers. Still other additives include solid particles such as minerals, glass, silica, etc., which can be used to adjust physical properties, reduce shrinkage, and/or enhance abrasion resistance. Any of these other additives may be present in the ink composition in an amount, or combined amount, generally from about 0.5 wt-% to about 50 wt-%, and typically from about 1 wt-% to about 10 wt-%. Those skilled in the art, having knowledge of the present specification, will be able to determine types and amounts of these other additives, in view of the specific printing methods, substrates, and other parameters required for a given ink composition and its corresponding application.

Substrates

Ink compositions described herein may be applied to a substrate and then subjected to a condition (e.g., electromagnetic energy, heat, actinic radiation, or a combination thereof) while on the substrate, to cause consolidation (e.g., through melting, curing, and/or solvent evaporation) of resin particles and adherence of the consolidated resin to the substrate. According to specific embodiments, a thermoplastic polymer or thermosetting polymer contained in the resin particles may be customized, or matched to the material of the substrate. For example, the substrate, or surface of the substrate to which the consolidated resin is adhered, may comprise, consist of, or consist essentially of a thermoplastic polymer or thermosetting polymer of the same type or same general type as that of the consolidated resin. For example, in the case of the same type, thermoplastic polymers of both the consolidated resin (and consequently the resin particles of the ink composition) and substrate may be polyethylene. In the case of the same general type, these thermoplastic polymers may both by polyolefins (e.g., the consolidated resin may comprise polypropylene and the substrate, or surface of the substrate to which the consolidated resin is adhered, may comprise polyethylene). This can advantageously lead to desired compatibility between the ink composition and substrate, in terms of melting of thermoplastic resin particles onto the same type or same general type of thermoplastic polymer that the substrate comprises. Compatibility may also be realized in terms of curing (by chemical cross-linking) of thermosetting resin particles onto the same type or same general type of thermosetting polymer that the substrate comprises. Overall, therefore, compatibility may be realized by consolidating thermoplastic or thermosetting resin particles onto the same type or same general type of a respective thermoplastic or thermosetting polymer that the substrate comprises.

Accordingly, representative substrates may comprise any of the thermoplastic or thermosetting polymers as described above with respect to thermoplastic or thermosetting resin particles used in ink compositions. In the case of thermoplastic polymers, for example, substrates may comprise a polyolefin or a polyolefin blend (e.g., polyethylene and/or polypropylene), a polyester (e.g., polyethylene terephthalate (PET) or polybutylene terephthalate (PET)), polycarbonate, acrylonitrile-butadiene-styrene (ABS), or blends thereof (e.g., a blend of ABS and polycarbonate, or ABS/PC).

Representative substrates comprise plastic molded parts, such as parts molded from polyolefin resins (e.g., polyethylene and polypropylene resins). The molded parts may be made by techniques such as injection molding, blow molding, rotational molding or thermal forming. Specific substrates include storage containers, which may be made of rigid or flexible materials, such as a hard or soft cooler, a cargo case, a bucket, or a drink container or drinkware item, such as a tumbler, bottle, mug, or jug. Other substrates may be metallic, and may comprise, for example stainless steel, such as in the case of a drinkware item comprising, and at least having an outer surface of, this metal. According to a specific example, a thermosetting resin-containing ink composition may be applied directly or indirectly (e.g., via a transfer medium as described below) onto a stainless steel tumbler, bottle, mug, or jug, such as by inkjet printing.

In general, printing methods described herein are applicable to a wide variety of substrates, including those comprising plastic, metals, glass, paper, fabrics, or wood, for example on an external layer or external part of a substrate to which ink compositions described herein are applied and consolidated. In addition to the specific polymers described above, substrates may comprise other plastics, for example those in the form of polymeric films, foamed materials, and synthetic fabrics. Examples of synthetic fabrics are polyester, nylon, vinyl, and rayon fabrics, and in some cases these may be used as an external layer or external part of a container or case. Natural fabrics that may serve as substrates include cotton, wool, and burlap. Metallic substrates in the form of thin, flexible sheets, to which ink compositions described herein are applied and consolidated, may also be used.

Representative substrates may be pre-printed (e.g., using conventional ink), such as with lettering and/or a decoration, onto which ink compositions described herein may be applied. Such application may be used to achieve an aesthetic, three-dimensional effect of the printed matter on the substrate. Representative substrates also include decals, logos, badges, labels, etc., and these may be intended for being adhered, for example, to a storage container or to drink container or drinkware item. Whereas substrates often have a flat surface, printing methods described herein can also be used with substrates having curved or irregular surfaces, such as the surfaces of a tumbler, bottle, mug, jug, or other drinkware item, or other type of rounded container. Although ink compositions can be applied directly to flat, curved, or irregular surfaces (e.g., by inkjet printing or other printing method), in some embodiments, a flat transfer medium may be used as the substrate. A transfer medium may be in the form of a sheet, roll, or ribbon formed of paper, synthetic paper, or plastic. A transfer medium may also be in the form of a film, such as a cast, blown, calendered or extruded film of any suitable material, including polyethylene, polypropylene, polyester, polyamide, polyvinylchloride, etc. A representative example of a transfer medium is a polyester film that is preferably transparent.

For example, the ink composition may be applied, such as by inkjet printing, to a flat transfer medium as a substrate and then transferred to a final article having a curved surface. In the case of using a transfer medium, an ink composition as described herein may be applied to, and consolidated onto, or at least partially consolidated onto, such transfer medium, and then the consolidated, or at least partially consolidated, resin transferred onto a final article. In the case of the ink composition being partially consolidated, it may be transferred with the resin in a tackified state to the final article, before the resin is more fully consolidated and adhered to the final article (e.g., by melting or cross-linking). Whether the resin is consolidated or partially consolidated on the transfer medium, transfer to the final article may be accompanied by the use of pressure, heat, or a combination of pressure and heat, to promote the adherence of the resin to the final article. To accomplish the transfer, representative pressures are generally from about 1 to about 10 megapascals (MPa), and typically from about 3 to about 7 MPa, and representative temperatures are generally from about 200° C. to about 400°, and typically from about 225° C. to about 300° C. These pressures and/or temperatures may be maintained for a transfer time generally from about 1 to about 60 seconds, and typically from about 2 to about 30 seconds.

In the case of using a transfer medium as the substrate, the "final article" to which the resin is adhered, or on which the resin is fully consolidated, may correspond to a "substrate" as described above (e.g., a storage container, or a drink container or drinkware item).

Representative Printing Methods, Including Application of the Ink Composition

Particular methods comprise (a) applying a thermoplastic resin-containing ink composition as described herein to a substrate as described herein, and (b) subjecting the composition (or areas of the substrate where the composition has been applied) to electromagnetic energy sufficient for heating the electromagnetic susceptor particles, for example to cause melting of at least a portion of the thermoplastic resin particles (or thermoplastic polymer contained in these particles) and/or volatilizing of at least a portion of the solvent. Other particular methods comprise (a) applying a thermosetting resin-containing ink composition to a substrate as described herein, and (b) subjecting the composition (or areas of the substrate where the composition has been applied) to heat or actinic radiation sufficient for curing the thermosetting resin particles (or cross-linking of the thermosetting polymer, optionally in combination with volatilizing at least a portion of the solvent). The methods may therefore generally include an application step (a) of applying the thermoplastic resin-containing ink composition or the thermosetting resin-containing ink composition to the substrate, and a consolidation step (b) of consolidating the resin to the substrate.

In some embodiments, according to step (a), the ink composition may be applied by inkjet printing. That is, droplets of ink composition may, in this step, be ejected or "jetted" from an inkjet printer onto at least a portion (e.g., a continuous portion or multiple, non-contiguous portions) of the external surface of the substrate. The inkjet printer stores printing data electronically and controls a mechanism for ejecting the ink composition onto portions of the substrate to form a desired image, such as text or a decoration (e.g., graphics). Movement of the print head, the substrate, or both may be used to produce this result. The jetting of droplets can be performed in several different ways. In one type of process called continuous inkjet printing, the stream jetted from an orifice of the print head is broken up into droplets of uniform size and spacing, through the application of a pressure wave pattern. These droplets may be directed (e.g., deflected) to their desired destination (e.g., to the substrate or to a gutter for recuperation) by the use of electrostatic charging.

According to another inkjet printing process, the print head ejects droplets via a "drop on demand" method (DOD) only when they are needed for forming the desired image. This avoids the complexity of drop charging, as well as deflection and collection equipment. In DOD inkjet printing, droplet formation can occur by a pressure wave created from mechanical motion of a piezoelectric transducer ("piezo" method), or by discrete thermal pushes ("bubble jet" or "thermal jet" methods). In piezoelectric-based, DOD inkjet printing systems a voltage pulse, applied to a piezoelectric transducer, produces a volumetric change in the fluid within a print head. This volumetric change in turn causes pressure/velocity transients to occur in the fluid which are directed to produce a drop from the orifice of the print head. A voltage pulse is thus applied only when a drop is desired. In general, inkjet printing technology is attractive for the application of thermoplastic resin-containing ink compositions and thermosetting resin-containing ink compositions described herein, due to its precision, speed, and repeatability. For example, in the case of printing lettering, an inkjet printer can apply individual letters of printed text to small areas with great accuracy.

In alternative embodiments, according to step (a), the thermoplastic resin-containing ink composition or thermosetting resin-containing ink composition may be applied by intaglio printing, which encompasses gravure printing methods such as tampography or pad printing. The ink composition may also be applied according to other methods, such as by screen printing (e.g., silk screen printing) or stencil printing, in either case optionally utilizing a spray gun for application, or by painting. With intaglio printing methods, the area of the image to be printed is recessed, using numerous minute recesses, cells, or mold cavities which are engraved into a printing surface, such as a printing plate or a cylindrical gravure surface, and are adapted to be filled with the ink composition. These recesses or cells, which form the image, may be etched or engraved with chemicals or tools. During intaglio printing, the cells are first filled with the ink composition from a reservoir or trough, and an excess amount of the ink composition is then wiped (e.g., using a steel doctor blade) from the "non-print" or "land" areas on the plate surface. Pressure is applied to transfer the ink composition, residing in the volumes of recesses or cells, to a substrate as described herein (e.g., a storage container, or otherwise a drink container or drinkware item, or possibly a transfer medium for indirect transfer to any of these).

Gravure printing is a specific example of an intaglio printing method using an engraved printing surface, as described above. In particular, this surface is cylindrical and rotates through the ink reservoir and then past a doctor blade, leaving the recesses or cells on this surface full, while excess ink from the land area is returned to the reservoir for recycle and consequently better utilization. The gravure cylinder is normally positioned opposite a soft (e.g., rubber) impression cylinder, in order for an ink image to be effectively transferred or pressed onto a substrate, when fed between the gravure printing cylinder and impression cylinder as both cylinders rotate. Typically, a very high quality image results on the substrate. In general, gravure printing is especially suitable for high speed, high volume printing applications. The ink compositions described herein can, according to some embodiments, effectively flow to fill recesses or cells of printing surfaces having considerable depth (e.g., up to 5 mm or greater) and released with high efficiency onto the substrate, with good maintenance of the desired printed image (i.e., without significant dispersion), possibly having an aesthetic, three-dimensional effect. Other suitable, recessed printing surfaces include plates, belts, sleeves, etc. Anilox surfaces, in which, for example, the entire surface is patterned or etched with an array of closely spaced, shallow cells or depressions, can also be used.

Pad printing may be used generally, and may be particularly preferred for application of the ink compositions to substrates having an irregular surface, such as a textured surface. The surface of the printing pad or platen may be contoured or otherwise adapted to that of the substrate. The pad may be formed of a compressible foam or other deformable material that is imprinted with an ink image to be transferred, when the pad is compressed against the substrate.

In the case of screen printing or stencil printing, suitable screens can be composed of nylon and/or polyester thread. Alternatively, steel screens can be used. Areas of the screen are blocked off with a non-permeable material to form a negative of the image to be printed, meaning that the open spaces correspond to locations where the ink composition will appear. Screens are specified by mesh count, corresponding to number of threads per unit length, with typical mesh counts for screen printing ranging from about 30 to about 150 threads per centimeter. Selection of the mesh count determines the thickness of the applied ink composition and the size of halftones that can be printed.

Any of these application steps (a) may be used to apply a thermoplastic resin-containing composition or a thermosetting resin-containing composition to a substrate as described herein (e.g., a storage container, or otherwise a drink container or drinkware item, or possibly a transfer medium for indirect transfer to any of these).

With respect to thermoplastic resin-containing ink compositions, all components of such compositions, including the solvent, the electromagnetic susceptor particles, the thermoplastic resin particles, and optionally the colorant, may be applied simultaneously to the substrate. According to such embodiments, the ink composition may prepared prior to application step (a). Alternatively, one or more of the solvent, the electromagnetic susceptor particles, the thermoplastic resin particles, and optionally the colorant may be applied to the substrate, separately from other components of the ink composition. According to such embodiments, the ink composition may be prepared during its application. For example, the thermoplastic resin particles and optionally the colorant may be applied as a customizable ink vehicle as described above, which may be tailored to a specific substrate, such as in terms of chemical and/or aesthetic compatibility. This application of the customizable ink vehicle to the substrate may precede, or follow, a separate application of the solvent and electromagnetic susceptor particles as a base ink vehicle. In a specific embodiment, this base ink vehicle may be applied to the substrate initially, followed by applying the thermoplastic resin particles and optional colorant to the other components of the ink composition (e.g., the customizable ink vehicle), and to the substrate.

In the same manner, with respect to thermosetting resin-containing ink compositions, all components of such compositions, including the solvent, the thermosetting resin particles, optionally the colorant, and optionally the photoinitiator, may be applied simultaneously to the substrate. According to such embodiments, the ink composition may be prepared prior to application step (a). Alternatively, one or more of the solvent, the thermosetting resin particles, optionally the colorant, and optionally the photoinitiator may be applied to the substrate, separately from other components of the ink composition. According to such embodiments, the ink composition may be prepared during its application. For example, the thermosetting resin particles and optionally the colorant may be applied as a customizable ink vehicle as described above, which may be tailored to a specific substrate, such as in terms of chemical and/or aesthetic compatibility. This application of the customizable ink vehicle to the substrate may precede, or follow, a separate application of the solvent and optionally the photoinitiator as a base ink vehicle. In a specific embodiment, this base ink vehicle may be applied to the substrate initially, followed by applying the thermosetting resin particles and optionally the colorant to the other components of the ink composition (e.g., the customizable ink vehicle), and to the substrate.

In this manner, both thermoplastic resin-containing ink compositions and thermosetting resin-containing ink compositions may advantageously be formed by the separate addition on the substrate, of a respective customizable ink vehicle as a component of these compositions. This customizable ink vehicle may, more particularly, be customized to a specific substrate that differs from another substrate in terms of its composition, but that may nonetheless be printed with an ink composition that utilizes the same base ink vehicle. Customization may, as described above, involve matching a type of thermoplastic polymer or thermosetting polymer, of respective thermoplastic resin particles or thermosetting resin particles, with the same type or same general type of polymer of the substrate.

Accordingly, in representative methods according to the claimed invention utilizing a thermoplastic resin-containing ink composition, the solvent and electromagnetic susceptor particles may be present in a base ink vehicle (e.g., that forms part of the ink composition). These methods may further comprise applying the base ink vehicle to a second substrate (e.g., that differs from a substrate to which the ink composition was applied initially, such as in the case of a second substrate comprising a thermoplastic polymer of a different type or different general type), followed by applying, to the base ink vehicle on the second substrate, a second type of thermoplastic resin particles and optionally a second colorant to form a second composition. This second type of thermoplastic resin particles may be customized, as described above, by matching the type of thermoplastic polymer of the resin particles, with the same type or same general type of polymer of the second substrate. These methods may yet further comprise subjecting the second composition (or areas of the substrate where the second composition has been applied), comprising the base ink vehicle, the second type of thermoplastic resin particles, and optionally the second colorant, to electromagnetic energy suitable for heating the electromagnetic susceptor particles, as well as melting of at least a portion of the second type of thermoplastic resin particles, and optionally volatilizing at least a portion of the solvent. The second substrate may preferably comprise a thermoplastic polymer of the same type or same general type as that of the second type of thermoplastic resin particles, in order to achieve compatibility as described herein.

In representative methods according to the claimed invention utilizing a thermosetting resin-containing ink composition, the solvent and optionally the photoinitiator may be present in a base ink vehicle (e.g., that forms part of the ink composition). These methods may further comprise applying the base ink vehicle to a second substrate (e.g., that differs from a substrate to which the ink composition was applied initially, such as in the case of a second substrate comprising a thermosetting polymer of a different type or different general type), followed by applying, to the base ink vehicle on the second substrate, a second type of thermosetting resin particles and optionally a second colorant to form a second composition. This second type of thermosetting resin particles may be customized, as described above, by matching the type of thermosetting polymer of the resin particles, with the same type or same general type of polymer of the second substrate. These methods may yet further comprise subjecting the second composition (or areas of the substrate where second the composition has been applied), comprising the base ink vehicle, the second type of thermosetting resin particles, and optionally the second colorant, to heat or actinic radiation suitable for curing the second type of thermosetting resin particles. The second substrate may comprise a thermosetting polymer of the same type or same general type as that of the second type of thermosetting resin particles, in order to achieve compatibility as described herein. The flexibility associated with inkjet printing may be particularly suitable for adapting various customizable ink vehicles to their respective substrates, in forming "on demand" ink compositions as described herein.

Representative Printing Methods, Including Consolidation of the Resin

The consolidation step, in general or in the more particular case of application of a thermosetting resin-containing ink composition (e.g., comprising a thermosetting polyepoxide, a thermosetting polyacrylate, a thermosetting polyurethane, a thermosetting polysiloxane, a thermosetting polyester, a thermosetting phenolic polymer, or a thermosetting amine-functional polymer), may comprise subjecting the applied ink composition to temperature from about 50° C. to about 300° C., such as from about 150° C. to about 250° C., for a time period from about 1 minute to about 120 minutes, such as from about 10 minutes to about 45 minutes, as needed to cure the thermosetting polymer or otherwise consolidate the resin according to a manner described herein, for example with the optional volatilization of solvent. Heating for consolidation may be performed, for example, using a gas fired or electrical infrared drying oven, a forced air oven, open flame, etc. The oven or other heating equipment may include volatile component recovery equipment, such that the solvent (e.g., hydrocarbon) can be reused.

Other consolidation temperatures and times may be tailored to specific ink compositions. For example, particular ink compositions include any of those described above, in which the solvent component is partly or completely replaced with a plasticizer (e.g., these compositions may contain little or no solvent). In some cases, the plasticizer may be present in the ink composition in an amount generally from about 20 wt-% to about 85 wt-%, and typically from about 45 wt-% to about 70 wt-%. Representative plasticizers include phthalate esters and benzoic acid, as well as others known in the art, and these may be used in an ink composition comprising thermoplastic resin particles as described above, optionally in combination with colorants and other additives (e.g., binders) as described above. The consolidation step according to printing methods using these ink compositions may comprise a shorter "cure" time, for example from about 5 seconds to about 5 minutes, such as from about 10 second to about 75 seconds, at a temperature within a range as described above. For example, a representative ink composition is a plastisol composition comprising predominantly thermoplastic resin particles (e.g., polyvinylchloride resin particles) and a plasticizer, together with an optional colorant and/or other additive, but comprising substantially no solvent. When heated to a temperature of at least about 150° C., such as at least about 160° C. or at least about 180° C., the thermoplastic resin particles absorb the plasticizer, causing them to fuse together, forming a viscous gel. Upon cooling below at temperature of at most about 100° C., such as at most about 85° C. or at most about 60° C., a flexible, permanently plasticized solid product results. These steps of heating and cooling, to consolidate the thermoplastic resin particles in such compositions, is often referred to as "curing," although this does not involve chemical cross-linking.

As described above, in the case of a thermoplastic resin-containing composition, consolidation may advantageously be accomplished without the need for direct heating, but instead by subjecting the composition, after its application to the substrate, to electromagnetic energy suitable for heating the electromagnetic susceptor particles present in these compositions. In the case of a thermosetting resin-containing composition, consolidation may be accomplished by subjecting the composition to actinic radiation as described above. Accordingly, depending on the specific ink composition and printing application, the consolidation step (b) may be carried out using electromagnetic radiation (e.g., in the case of a thermoplastic resin-containing composition) or actinic radiation (e.g., in the case of a thermosetting resin-containing composition), and in either case optionally together with the application of heat, such as through the use of temperatures and times as described above. Preferably, ink compositions may be tailored, for example based on the solvent and other additives used, to obtain desired properties (e.g., viscosity and volatility) at the various temperatures encountered during a specification application (e.g., inkjet print head temperature and consolidation temperature), as would be appreciated by those skilled in the art, having knowledge of the present specification.

In the case of the consolidation step (b) comprising subjecting the ink composition, following its application to the substrate, to electromagnetic energy or actinic radiation, the exposure time, energy/radiation intensity, and wavelength may be varied to readily achieve the optimal effect, for example depending on the specific characteristics of the ink composition, its thickness, and the substrate. The equipment used to generate the energy/radiation may be an integral part of the equipment used to apply the ink composition to the substrate (e.g., the inkjet printer) or it may be separate. In any event, it is generally desired to consolidate the resin soon after it is applied to the substrate, in order to minimize dispersion of the ink composition onto unwanted portions of the substrate. Also, according to some embodiments, ink compositions may also be applied to a substrate in multiple layers (e.g., to create desired color or three-dimensional effects), with consolidation or partial consolidation occurring between application of subsequent layers.

Overall, aspects of the invention relate to ink compositions that can be applied to, and adhered onto, a variety of substrates. Particular compositions utilize electromagnetic susceptor particles that, upon being subjected to electromagnetic energy of the appropriate wavelength (e.g., radiofrequency (RF) energy or microwave energy), heat thermoplastic resin particles of the composition to cause localized heating. This can, in turn, result in melting and consolidation of the thermoplastic resin onto a substrate. Direct heating may also be used to cause consolidation. Other compositions, comprising thermosetting resin particles, can be cured onto a substrate by exposure to actinic radiation, heat, moisture, or a combination of these. With respect to any of these compositions, they may be applied according to a variety of possible methods, including inkjet printing, intaglio printing, silk screen printing, stencil printing, painting, etc. Further flexibility resides in the possible use of a transfer medium (e.g., transfer film) onto which the ink composition is printed, for indirect application to the substrate. Those skilled in the art having knowledge of the present disclosure, will recognize that various changes can be made to ink compositions and associated printing methods, in attaining these and other advantages, without departing from the scope of the present disclosure. As such, it should be understood that the features of the disclosure are susceptible to modifications and/or substitutions without departing from the scope of this disclosure. The specific embodiments illustrated and described herein are for illustrative purposes only, and not limiting of the invention as set forth in the appended claims.

What is claimed is:

1. A method for printing on, or decorating, a substrate using an ink composition comprising:
   a solvent;
   electromagnetic susceptor particles;
   thermoplastic resin particles;
   the method comprising:
   (a) applying the ink composition to the substrate, and
   (b) subjecting the composition to electromagnetic energy sufficient for heating the electromagnetic susceptor particles, to cause consolidation of the thermoplastic resin particles onto the substrate.

2. The method of claim 1, wherein the thermoplastic resin particles comprise a thermoplastic polymer selected from the group consisting of a thermoplastic polyolefin, a thermoplastic polyurethane, a thermoplastic polyether, a thermoplastic polyester, a thermoplastic polyacrylate, a thermoplastic polystyrene, a thermoplastic polyamide, a thermoplastic polyvinylchloride, a thermoplastic polycarbonate, a thermoplastic cellulosic polymer, a thermoplastic acrylonitrile-butadiene-styrene (ABS) polymer, and mixtures thereof.

3. The method of claim 1, wherein the electromagnetic susceptor particles comprise a metal, or compound or alloy thereof.

4. The method of claim 3, wherein the metal is selected from the group consisting of aluminum, tin, zinc, barium, iron, nickel, manganese, and silicon.

5. The method of claim 3, wherein the compound of the metal is an oxide, nitride, or carbide of the metal.

6. The method of claim 1, wherein the electromagnetic susceptor particles comprise a form of carbon.

7. The method of claim 1, wherein the electromagnetic energy is radiofrequency (RF) energy or microwave energy.

8. The method of claim 1, wherein, in step (a), the ink composition is applied by inkjet printing.

9. The method of claim 1, wherein, in step (a), the ink composition is applied by intaglio printing, silk screen printing, stencil printing, or painting.

10. The method of claim 1, wherein, in step (a), the ink composition is applied to a transfer medium, the method further comprising, following step (b), transferring consolidated or partially consolidated resin onto a final article.

11. The method of claim 1, wherein, in step (a), all components of the ink composition, including the solvent, the electromagnetic susceptor particles, and the thermoplastic resin particles are applied simultaneously to the substrate.

12. The method of claim 1, wherein, in step (a), one or more of the solvent, the electromagnetic susceptor particles, and the thermoplastic resin particles are applied to the substrate, separately from other components of the ink composition.

13. The method of claim 12, wherein the thermoplastic resin particles are applied separately from the solvent and electromagnetic susceptor particles.

14. The method of claim 1, wherein the thermoplastic resin particles have an average particle size from about 1 nanometer to about 1 millimeter.

15. The method of claim 1, wherein the ink composition further comprises a colorant that is a dye or a pigment.

16. The method of claim 15, wherein the colorant is present in the ink composition in an amount from about 1 wt-% to about 25 wt-%.

17. The method of claim 1, wherein the consolidation of the thermoplastic resin particles is in the form of lettering or a decoration.

18. The method of claim 1, wherein the substrate is a cooler or a drinkware item.

19. The method of claim 1, wherein the thermoplastic resin particles comprise a thermoplastic resin of a same type as present in the substrate.

\* \* \* \* \*